Dec. 5, 1950            H. M. REEVES            2,532,461
COMBINATION GRATE AND BURNER BOWL
STRUCTURE FOR GAS COOKSTOVES
Filed Aug. 30, 1945
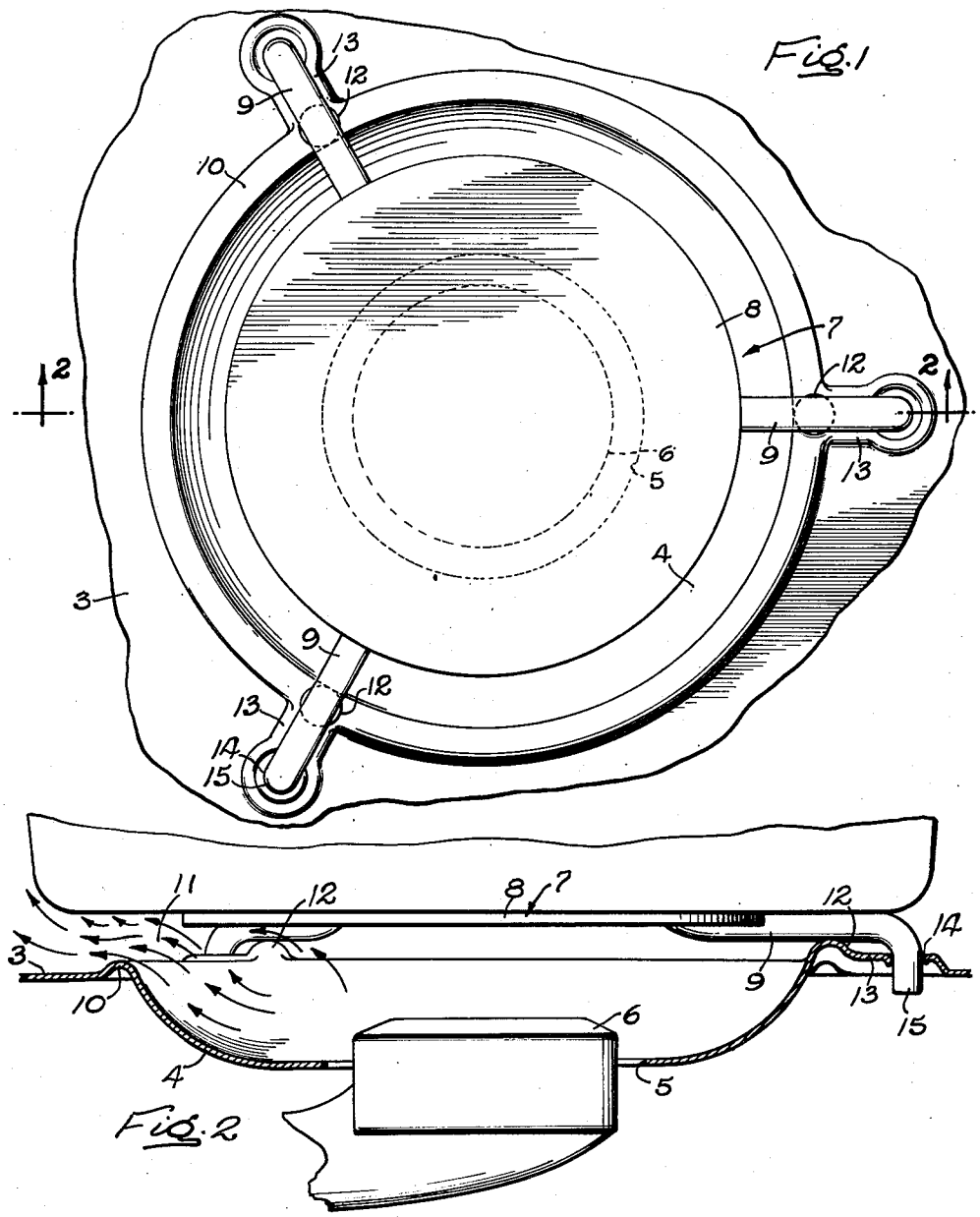
INVENTOR
Herbert M. Reeves
ATTORNEYS Patented Dec. 5, 1950

2,532,461

UNITED STATES PATENT OFFICE 2,532,461

COMBINATION GRATE AND BURNER BOWL STRUCTURE FOR GAS COOKSTOVES

Herbert M. Reeves, Kankakee, Ill., assignor to Florence Stove Company, Gardner, Mass., a corporation of Massachusetts Application August 30, 1945, Serial No. 613,478

6 Claims. (Cl. 126—214)

The invention pertains to gas cookstoves and has more particular reference to an improved cooking top structure for such stoves.

The primary object of the invention is to provide a cooking top structure which is simple in construction, susceptible of low cost manufacture and effectual in operation.

More particularly stated, the invention aims to provide a cooking top in which the burner bowl is formed integral with the top plate in combination with means for directing the burning gases away from the top plate and into intimate contact with the overlying utensil supported above the burner bowl.

A further object is to provide an improved utensil supporting means effectually protecting the burner against spillage and including a central disk of thin sheet metal and radial supports seated upon the top plate externally of the bowl and coacting with the disk in supporting utensils of large size.

The objects of the invention thus generally stated, together with other and ancillary advantages, are attained by the construction and arrangement shown by way of illustration in the accompanying drawings, in which:

Figure 1 is a plan view showing a portion of a cooking top embodying a burner bowl and utensil supporting means made in accordance with my invention.

Fig. 2 is a fragmentary vertical sectional view taken approximately in the plane of line 2—2 of Fig. 1.

In the exemplary embodiment of my invention herein shown, the improved cooking top structure comprises a top plate 3 formed of sheet steel having one or more burner bowls 4 (one only herein being shown), centrally apertured to provide an opening 5 for the reception of a gaseous fuel burner 6. Coacting with the burner bowl is a utensil supporting grate generally designated 7 and comprising a circular disk 8 and a plurality of radial supporting arms 9.

In accordance with my invention, the burner bowl 4 is formed integral with the top plate 3, and between the bowl and the top plate is formed a raised annular bead 10. This bead serves to stiffen the top structure and additionally constitutes an annular rim serving to deflect the hot gases away from the top plate 3 and into intimate or scrubbing contact with the bottom of a large utensil supported upon the grate 7. At the same time, the bead or rim 10 defines the marginal edge of the bowl, and because of the elimination of any crevices or the like between the bowl and the top plate, due to the integral formation of these parts, spillage from overlying utensils is more effectually directed into the bowl for escape through the opening 5 around the burner into the usual drip tray below.

The disk 8 of the utensil supporting grate 7 provides a firm support for small utensils. It is preferably made of a diameter somewhat less than that of the bowl and forms with the rim 10 a relatively restricted annular passage 11 for the products of combustion. The disk may be made advantageously of thin sheet steel of high heat conducting capacity.

The radial supporting arms 9 are preferably three in number so as to provide a three point support for the grate. As shown, they are in the form of rods notched or recessed at their inner ends to receive the peripheral edge portion of the disk, the recess being of a depth corresponding to the thickness of the plate so that the upper surfaces of the arms are disposed flush with the face of the disk.

Preferably, the top plate is constructed to provide raised bosses 12 rising from the bead or rim 10 and respectively underlying the three arms so as to provide rests therefor. Radially of the rim, the plate has raised portions 13 with sockets or holes 14 for receiving depending legs 15 formed by bending the outer ends of the rods 9 downwardly. By this construction, the grate is effectually supported upon the top plate by resting directly thereon, and it is held against tilting and also in properly centered relation with respect to the burner bowl by the depending legs 15 interengaging with the top plate.

It will be seen that the improved top structure is exceedingly simple in construction. Not only can it be manufactured at a very low cost but the weight of the stove for shipping purposes is reduced as compared with stoves having conventional cast iron grates. Moreover, my invention provides for the support of cooking utensils in a manner such as to insure effectual heat transfer to the utensils while at the same time protecting the top externally of the bowl against overheating. Finally, the burner is well protected against spillage, and proper direction of the latter away from the bowl is assured.

I claim as my invention:

1. In a gas cookstove, the combination of a sheet metal top plate, a burner bowl depressed out of the top plate and having a central burner opening, a grate for supporting a cooking utensil above the bowl and in spaced relation to the top plate, and an annular deflecting rim formed integral with the top plate and projecting upwardly above the surface of the plate so as to deflect the products of combustion upwardly away from the top plate and toward the bottom of an overlying cooking utensil, said grate comprising a circular disk overlying the burner bowl and having a plurality of supporting arms engageable with said rim and terminating in depending legs, and said top plate having sockets formed therein for receiving said legs.

2. In a gas cookstove, the combination of a top plate having a burner bowl provided with a burner opening, an annular bead formed integral with the top plate and projecting upwardly from the top plate at the marginal edge of the bowl, a utensil supporting grate comprising a disk having a plurality of arms, bosses projecting upwardly from said bead and providing rests for said arms, and socket members on the top plate externally of the bead for receiving the outer depending portions of the arms.

3. In a gas cookstove, the combination of a sheet metal top plate having a depressed burner bowl with a burner opening therein, a grate for supporting a cooking utensil above the burner opening and in spaced relation to the top plate, projections extending above the surface of said top plate externally of said burner bowl, said grate comprising a disk having a plurality of radially projecting arms adapted to rest on said projections, and cooperating means on said arms and said top plate for maintaining said arms in alinement with said projections.

4. In a gas cookstove, the combination of a sheet metal top plate having a depressed burner bowl with a burner opening therein, a utensil supporting grate supported from said top plate above the burner opening and in spaced relation to the top plate, said grate comprising a disk having a plurality of arms projecting radially therefrom over the top plate, and depending legs formed on the projecting ends of said arms, said top plate having sockets for receiving said legs to maintain the grate in a predetermined position with respect to the burner bowl.

5. A cookstove having, in combination, a sheet metal top plate with a depressed burner bowl provided with a central burner opening, a burner located centrally of said opening at the bottom of said bowl, said plate having an annular bead at the edge of said bowl projecting upwardly above the plane of the plate, and a utensil supporting grate comprising a flat circular disk of a diameter substantially less than the internal diameter of said bead and a plurality of arms extending radially outward from said disk in overlying relation to said bead, said arms engaging with said top plate to support the disk with its upper surface in a plane spaced vertically from the upper surface of the bead and also coacting with said plate to hold the grate against lateral as well as rotational movement with said disk in centered position with respect to the burner bowl.

6. In a gas cookstove, in combination, a sheet metal top plate having a depressed burner bowl provided with a central burner opening, a burner located centrally of said opening adjacent the bottom of said bowl, a plurality of projections extending upwardly from the surface of the top plate externally of said burner bowl, a utensil supporting grate comprising a central supporting element having its outer edge spaced inwardly from the edge of said burner bowl and a plurality of arms extending radially outward from said element to overlie and rest on said projections, and coacting means on said arms and said top plate operative to hold the grate against lateral as well as rotational movement and thereby maintain said arms in alinement with said projections.

HERBERT M. REEVES.

REFERENCES CITED

The following references are of record in the file of this patent:

UNITED STATES PATENTS

| Number | Name | Date |
|---|---|---|
| 271,158 | Thomas | Jan. 23, 1883 |
| 616,521 | Berkicht | Dec. 27, 1898 |
| 1,145,488 | Kendall | July 6, 1915 |
| 1,572,168 | Smith | Feb. 9, 1926 |
| 1,663,438 | Brumbaugh | Mar. 20, 1928 |
| 1,959,657 | Chambers | May 22, 1934 |
| 2,088,652 | Hobson | Aug. 3, 1937 |
| 2,185,275 | Sherman | Jan. 2, 1940 |
| 2,232,482 | Schulz | Feb. 18, 1941 |
| 2,257,395 | Parker | Sept. 30, 1941 |

FOREIGN PATENTS

| Number | Country | Date |
|---|---|---|
| 101,348 | Switzerland | Sept. 17, 1923 |
| 330,474 | Germany | Dec. 16, 1920 |
| 335,487 | Germany | Apr. 5, 1921 |